United States Patent Office 3,408,398
Patented Oct. 29, 1968

3,408,398
2-CYCLOBUTEN-1-ONE COMPOUNDS AND PROCESS FOR THEIR PREPARATION
James C. Martin, Kingsport, Tenn., assignor to Eastman Kodak Company, Rochester, N.Y., a corporation of New Jersey
No Drawing. Filed Mar. 17, 1964, Ser. No. 352,629
11 Claims. (Cl. 260—586)

ABSTRACT OF THE DISCLOSURE 2-cyclobuten-1-yne compounds are prepared by combining ketenes and 1-butene-3-yne compounds. The reaction of dimethyl ketene and 1-methoxy-1-butene-3-yne to produce 4,4-dimethyl-3-(2-methoxyvinyl)-cyclobuten-1-one is representative. The novel 2-cyclobuten-1-one compounds are effective plasticizers for resins such as polyvinyl chloride.

---

This invention relates to novel chemical compounds and to their preparation. More particularly, it relates to novel 2-cyclobuten-1-one compounds and to novel methods for preparing them.

The novel 2-cyclobuten-1-one compounds have the formula:

I. 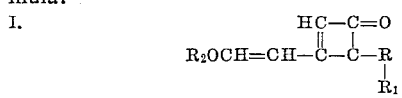

wherein R and $R_1$ each represents a member selected from the group consisting of hydrogen, an alkyl radical and an aryl radical and wherein R and $R_1$ together with the carbon atom to which they are attached represents a member selected from the group consisting of cyclopentylidene and cyclohexylidene and $R_2$ represents a member selected from the group consisting of an alkyl radical, a cycloalkyl radical and an aryl radical.

In accordance with the process of the invention the novel 2-cyclobuten-1-one compounds of the invention are prepared by combining a ketene having the formula:

II. 

with a 1-buten-3-yne compound having the formula:

III. $\quad R_2OCH=CH-C\equiv CH$ wherein R, $R_1$ and $R_2$ have the meaning previously assigned to them. The novel 2-cyclobuten-1-one product formed can be isolated either by distillation or by crystallization.

The following equation illustrates the process of the invention:

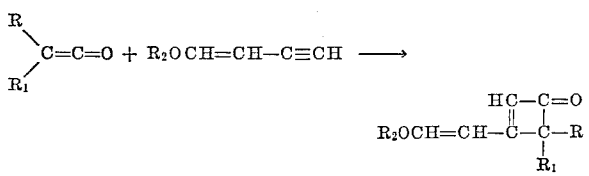

The temperatures employed in carrying out the process of the invention vary from about 0° C. to about 150° C. The process is ordinarily carried out by gradually adding the ketene to the 1-buten-3-yne compound. While the process is normally carried out using an already prepared ketene, if desired, the process can be carried out by forming the ketene in situ.

The process of the invention can be carried out with or without a suitable solvent. However, the use of a solvent is generally preferred. Suitable solvents are materials that serve to dissolve the reagents involved in the process but which do not react with them. Suitable inert solvents include, for example, diethyl ether, diisopropyl ether, dioxane, tetrahydrofuran, diethylketone, methylisobutylketone, hexane, naphtha, isooctane, benzene, toluene, xylene, carbon tetrachloride, chloroform, tetrachloroethane, acetonitrile, isobutyronitrile, ethyl acetate, butyl acetate, etc., and dipolar aprotic solvents such as dimethyl sulfoxide, dimethyl formamide, ethylene carbonate, sulfolane, etc. The function of the solvent can be quite important because in some cases the use of polar solvents accelerates the reaction and frequently increases the yield.

When R, $R_1$ and $R_2$ are alkyl each typically represented an alkyl radical having 1 to 8 carbon atoms such as methyl, ethyl, propyl, isopropyl, butyl, sec.butyl, tert.butyl, pentyl, hexyl, heptyl, octyl, 2-ethylhexyl, etc. although they can be a higher alkyl radical such as nonyl, decyl, undecyl, dodecyl, tridecyl, pentadecyl and octadecyl, for example. In general, R, $R_1$ and $R_2$ are preferably lower alkyl, e.g., of 1 to 4 carbon atoms.

Illustrative of the ketenes having the Formula I are ketene,
methylketene,
ethylketene,
propylketene,
isopropylketene,
butylketene,
isobutylketene,
tertiarybutylketene,
pentylketene,
hexylketene,
heptylketene,
octylketene,
2-ethylhexylketene,
nonylketene,
decylketene,
undecylketene,
dodecylketene,
tridecylketene,
tetradecylketene,
pentadecylketene,
hexadecylketene,
heptadecylketene,
octadecylketene,
dimethylketene,
ethylmethylketene,
diethylketene,
ethylpropylketene,
ethylisopropylketene,
dipropylketene,
diisopropylketene,
ethylbutylketene,
dibutylketene,
diisobutylketene,
di(tert.butyl)ketene,
dipentylketene,
dihexylketene,
diheptylketene,
dioctylketene,
di(2-ethylhexyl)ketene,
ethyldodecylketene,
didodecylketene,
dipentadecylketene,
dihexadecylketene,
didodecylketene,
dioctadecylketene,
methylpropylketene,
isobutylethylketene,
pentamethyleneketene,
hexamethyleneketene,
phenylketene,
p-methylphenylketene,
p-methoxyphenylketene,
p-ethoxyphenylketene,
diphenylketene, and
di(p-methylphenylketene),
for example.

Illustrative of the 1-buten-3-ynes used in carrying out the process of the invention are 1-methoxy-1-buten-3-yne,
1-ethoxy-1-buten-3-yne,
1-propoxy-1-buten-3-yne,
1-isopropoxy-1-buten-3-yne,
1-butoxy-1-buten-3-yne,
1-pentyloxy-1-buten-3-yne,
1-hexyloxy-1-buten-3-yne,
1-heptyloxy-1-buten-3yne,
1-octyloxy-1-buten-3-yne,
1-decyloxy-1-buten-3-yne,
1-undecyloxy-1-buten-3-yne,
1-dodecyloxy-1-buten-3-yne,
1-tetradecyloxy-1-buten-3-yne,
1-octadecyloxy-1-buten-3-yne,
1-cyclohexyloxy-1-buten-3-yne,
1-phenoxy-1-buten-3-yne,
1-(p-methylphenoxy)-1-buten-3-yne and
1-(p-methoxyphenoxy)-1-buten-3-yne, for example.

1-buten-3-yne compounds, such as 1-alkoxy-1-buten-3-yne compounds, for example, are well known. They can be prepared by the base catalyzed addition of alcohols to diacetylene, as described by T. Herbertz, Ber., 85, 475–82 (1952).

The novel 2-cyclobuten-1-one compounds of the invention are useful as plasticizers for cellulose acetate butyrate and polyvinyl chloride, for example.

The following examples illustrate the invention:

Example 1

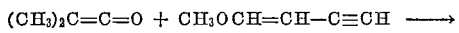

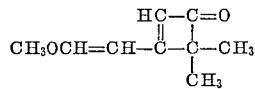

A solution of 123 g. (1.5 moles) of 1-methoxy-1-buten-3-yne in 300 ml. of ether was stirred at room temperature under nitrogen while 105 g. (1.5 moles) of dimethylketene was added. The reaction was exothermic but the temperature was kept at 20–25° C. by a cooling bath. Distillation of this solution through a 10-inch packed column gave unchanged 1-methoxy-1-buten-3-yne and 60.5 g. of 4,4-dimethyl-3-(2-methoxyvinyl) - 2 - cyclobuten-1-one, a liquid, B.P. 89–92° C. (1.2 mm.).

*Analysis.*—Calcd. for $C_9H_{12}O_2$: C, 71.1; H, 7.9. Found: C, 70.9; H, 8.2. The n.m.r. spectrum was consistent with the structure shown.

Infrared spectrum (smear): 5.8, 6.25 and 6.55$\mu$. The n.m.r. spectrum of this material contained peaks attributed to cis and trans isomers of 4,4-dimethyl-3-(2-methoxyvinyl)-2-cyclobuten - 1 - one: cis, singlet at 6.95

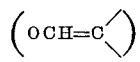

singlet at 5.88

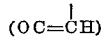

doublet centered at 5.42 (olefinic ring proton), singlet at 3.85 (methoxy group), and a singlet at 1.15 (two methyl groups); trans, a doublet centered at 7.90

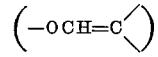

a doublet centered at 6.0 (olefinic ring proton), a doublet centered at 5.88

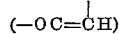

a singlet at 3.72 (methoxy group), and a singlet at 1.30 (two methyl groups).

Example 2

A solution of 82 g. (1.0 mole) of 1-methoxy-1-buten-3-yne in 200 ml. of acetonitrile was stirred at room temperature under nitrogen while 126 g. (1.0 mole) of butylethylketene was added. After the addition was complete, the solution was refluxed for 2 hours. Distillation of this solution through a 10-inch packed column gave some unchanged 1-methoxy-1-buten-3-yne and 82.3 g. of 4-n-butyl-4-ethyl - 3 - (2-methoxyvinyl)-2-cyclobuten-1-one, a liquid, B.P. 60–65° C. (50$\mu$.)

*Analysis.*—Calcd. for $C_{13}H_{20}O_2$: C, 70.0; H, 9.6. Found: C, 70.2; H, 9.6.

Example 3

85 parts (by weight) of cellulose acetate butyrate and 15 parts (by weight) of 4,4-dimethyl - 3 - (2-methoxyvinyl) - 2 - cyclobuten - 1 - one were milled together on heated rolls for 4 minutes at 270° F. using a Thropp milling machine. The resulting resin is tough, resilient and has good physical properties.

Example 4

50 parts (by weight) of polyvinyl chloride and 50 parts (by weight) of 4-n-butyl-4-ethyl-3-(2-methoxyvinyl)-2-cyclobuten-1-one were milled together on heated rolls for 4 minutes at 300° F. using a Thropp milling machine. The resulting resin is tough, resilient and has good physical properties.

Under the general conditions described in Example 1 the following ketene and 1-buten-3-yne compounds give the products shown in the following tabulation.

TABLE 1

| Ketene | 1-buten-3-yne | Product |
|---|---|---|
| Ketene | 1-methoxy-1-buten-3-yne | 3-(2-methoxyvinyl)-2-cyclobuten-1-one. |
| Do | 1-butoxy-1-buten-3-yne | 3-(2-butoxyvinyl)-2-cyclobuten-1-one. |
| Octylketene | do | 4-octyl-3-(2-butoxyvinyl)-2-cyclobuten-1-one. |
| Diphenylketene | 1-octadecyloxy-1-buten-3-yne | 4,4-diphenyl-3-(2-octadecyloxyvinyl)-2-cyclobuten-1-one. |
| Methylketene | 1-ethoxy-1-buten-3-yne | 4-methyl-3-(2-ethoxyvinyl)-2-cyclobuten-1-one. |
| Ethylketene | 1-propoxy-1-buten-3-yne | 4-ethyl-3-(2-propoxyvinyl)-2-cyclobuten-1-one. |
| Butylketene | 1-octyloxy-1-buten-3-yne | 4-butyl-3-(2-octyloxyvinyl)-2-cyclobuten-1-one. |
| Decylketene | 1-methoxy-1-buten-3-yne | 4-decyl-3-(2-methoxyvinyl)-2-cyclobuten-1-one. |
| Phenylketene | do | 4-phenyl-3-(2-methoxyvinyl)-2-cyclobuten-1-one. |
| Dimethylketene | 1-ethoxy-1-buten-3-yne | 4,4-dimethyl-3-(2-ethoxyvinyl)-2-cyclobuten-1-one. |
| Do | 1-propoxy-1-buten 3 yne | 4,4-dimethyl-3-(2-propoxyvinyl)-2-cyclobuten-1-one. |
| Do | 1-butoxy-1-buten-3-yne | 4,4-dimethyl-3-(2-butoxyvinyl)-2-cyclo-buten-1-one. |
| Do | 1-hexyloxy 1-buten-3-yne | 4,4-dimethyl-3-(2-hexyloxyvinyl)-2-cyclobuten-1-one. |
| Do | 1-octyloxy-1-buten-3-yne | 4,4-dimethyl-3-(2-octyloxyvinyl)-2-cyclobuten-1-one. |
| Do | 1-decyloxy-1-buten-3-yne | 4,4-dimethyl-3-(2-decyloxyvinyl)-2-cyclobuten-1-one. |
| Do | 1-octadecyloxy-1-buten-3-yne | 4,4-dimethyl-3-(2-octadecyloxyvinyl)-2-cyclobuten-1-one. |
| Do | 1-cyclohexyloxy-1-buten-3-yne | 4,4-dimethyl-3-(2-cyclohexyloxyvinyl)-2-cyclobuten-1-one. |
| Do | 1-phenoxy-1-buten-3-yne | 4,4-dimethyl-3-(2-phenoxyvinyl)-2-cyclobuten-1-one. |
| Diethylketene | 1-methoxy-1-buten-3-yne | 4,4-diethyl-3-(2-methoxyvinyl)-2-cyclobuten-1-one. |
| Do | 1-isopropoxy-1-buten-3-yne | 4,4-diethyl-3-(2-isopropoxyvinyl)-2-cyclobuten-1-one. |
| Do | 1-(p-methoxyphenoxy)-1-buten-3-yne | 4,4-diethyl-3-(2-p-methylphenoxyvinyl)-2-cyclobuten-1-one. |
| Dipropylketene | 1-methoxy-1-buten-3-yne | 4,4-dipropyl-3-(2-methoxyvinyl)-2-cyclobuten-1-one. |
| Diisopropylketene | do | 4,4-diisopropyl-3-(2-methoxyvinyl)-2-cyclobuten-1-one. |
| Dibutylketene | do | 4,4-dibutyl-3-(2-methoxyvinyl)-2-cyclobuten-1-one. |
| Ethylbutylketene | 1-pentyloxy-1-buten-3-yne | 4-butyl-4-ethyl-3-(2-pentyloxyvinyl)-2-cyclobuten-1-one. |
| Dihexylketene | 1-methoxy-1-buten-3-yne | 4,4-dihexyl-3-(2-methoxyvinyl)-2-cyclobuten-1-one. |
| Dioctylketene | do | 4,4-dioctyl-3-(2-methoxyvinyl)-2-cyclobuten-1-one. |
| Didecylketene | do | 4,4-didecyl-3-(2-methoxyvinyl)-2-cyclobuten-1-one. |
| Didodecylketene | do | 4,4-didodecyl-3-(2-methoxyvinyl)-2-cyclobuten-1-one. |
| Dioctadecylketene | do | 4,4-dioctadecyl-3-(2-methoxyvinyl)-2-cyclobuten-1-one. |
| Diphenylketene | do | 4,4-diphenyl-3-(2-methoxyvinyl)-2-cyclobuten-1-one. |
| p-Methylphenylketene | do | 4-p-methylphenyl-3-(2-methoxyvinyl)-2-cyclobuten-1-one. |
| Ketene | 1-p-methoxyphenoxy-1-buten-3-yne | 3-(2-p-methoxyphenoxyvinyl)-2-cyclobuten-1-one. |

TABLE 1—Continued

| Ketene | 1-buten-3-yne | Product |
|---|---|---|
| Pentamethyleneketene | 1-methoxy-1-buten-3-yne | 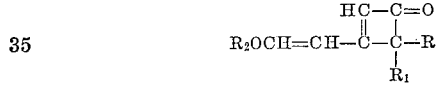 |
| Do | 1-butoxy-1-buten-3-yne | |
| Hexamethyleneketene | 1-methoxy-1-buten-3-yne | |
| Do | 1-butoxy-1-buten-3-yne | |

The ketene compounds employed in the preparation of the novel compounds of the invention can be prepared by methods known in the art, for instance, by methods described in "Organic Reactions," John Wiley and Sons, Inc., N.Y. (1946), vol. III, chapter 3. The dialkyl ketene reactants can also be prepared by the method described in copending application, Hasek and Elam, Ser. No. 841,961, filed Sept. 24, 1959, now Patent No. 3,201,474 and in Hasek and Elam Canadian Patent 618,772.

Although the invention has been described in considerable detail with particular reference to certain preferred embodiments thereof, variations and modifications can be effected within the spirit and scope of the invention as described hereinbefore, and as defined in the appended claims.

I claim:

1. A cyclobutenone compound having the formula:

$$\begin{array}{c} HC-C=O \\ \| \quad | \\ R_2OCH=CH-C-C-R \\ | \\ R_1 \end{array}$$

wherein R and $R_1$ each represents a member selected from the group consisting of hydrogen, an alkyl radical containing from 1 to 18 carbon atoms, phenyl, methylphenyl, methoxyphenyl and ethoxyphenyl; and wherein R and $R_1$ together with the carbon atom to which they are attached represents a member selected from the group consisting of cyclopentylidene and cyclohexylidene and $R_2$ represents a member selected from the group consisting of an alkyl radical containing from 1 to 18 carbon atoms, cyclohexyl, phenyl, methylphenyl, methoxyphenyl and ethoxyphenyl.

2. A cyclobutenone compound according to claim 1 wherein R, $R_1$ and $R_2$ each represents an alkyl radical containing from 1 to 18 carbon atoms.

3. A cyclobutenone compound according to claim 1 wherein R and $R_1$ each represents hydrogen and $R_2$ represents an alkyl radical containing from 1 to 18 carbon atoms.

4. 4,4-dimethyl-3-(2-methoxyvinyl)-cyclobuten-1-one.

5. 4 - n - butyl - 4 - ethyl - 3 - (2 - methoxyvinyl) - 2 - cyclobuten-1-one.

6. 3-(2-methoxyvinyl)-2-cyclobuten-1-one.

7. 4-n-octyl-3-(2-n-butoxyvinyl)-2-cyclobuten-1-one.

8. 4,4 - diphenyl - 3 - (2 - octadecyloxyvinyl) - 2 - cyclobuten-1-one.

9. A process for preparing a cyclobutenone compound having the formula:

$$\begin{array}{c} HC-C=O \\ \| \quad | \\ R_2OCH=CH-C-C-R \\ | \\ R_1 \end{array}$$

which comprises reacting a ketene having the formula $$\begin{array}{c} R-C=C=O \\ | \\ R_1 \end{array}$$

with a 1-buten-3-yne compound having the formula:

$$R_2OCH=CH-C\equiv CH$$

under cycloaddition reaction conditions at a temperature of from about 0 to about 150° C., and wherein in the foregoing formulas, R and $R_1$ each represents a member selected from the group consisting of hydrogen, an alkyl radical containing from 1 to 18 carbon atoms, phenyl, methylphenyl, methoxyphenyl, and ethoxyphenyl; and wherein R and $R_1$ together with the carbon atom to which they are attached represents a member selected from the group consisting of cyclopentylidene and cyclohexylidene and $R_2$ represents a member selected from the group consisting of an alkyl radical containing from 1 to 18 carbon atoms, cyclohexyl, phenyl, methylphenyl, methoxyphenyl and ethoxyphenyl.

10. A process according to claim 9 which comprises reacting a dialkyl ketene with a 1-alkoxy-1-buten-3-yne and recovering a 4,4-dialkyl-3-(2-alkoxyvinyl)-2-cyclobuten-1-one product.

11. A process according to claim 9 wherein the process is carried out in a dipolar aprotic solvent medium.

References Cited

UNITED STATES PATENTS 3,288,854  11/1966  Martin _____ 260—586

OTHER REFERENCES

Adams et al.: "Organic Reactions," vol. 12, p. 35 (1962).

LEON ZITVER, *Primary Examiner.*

M. JACOB, *Assistant Examiner.*

UNITED STATES PATENT OFFICE
CERTIFICATE OF CORRECTION

Patent No. 3,408,398  
October 29, 1968

James C. Martin

It is certified that error appears in the above identified patent and that said Letters Patent are hereby corrected as shown below:

Column 5, line 71, "4. 4,4-Dimethyl-3-(2-methoxyvinyl)-cyclobuten-1-one." should read -- 4. 4,4-Dimethyl-3-(2-methoxyvinyl)-2-cyclobuten-1-one. --.

Signed and sealed this 10th day of March 1970.

(SEAL)  
Attest:

Edward M. Fletcher, Jr.  
Attesting Officer

WILLIAM E. SCHUYLER, JR.  
Commissioner of Patents